INVENTORS
A. A. LOMBARD &
E. R. BREALEY
By Wilkinson & Mawhinney
ATTYS.

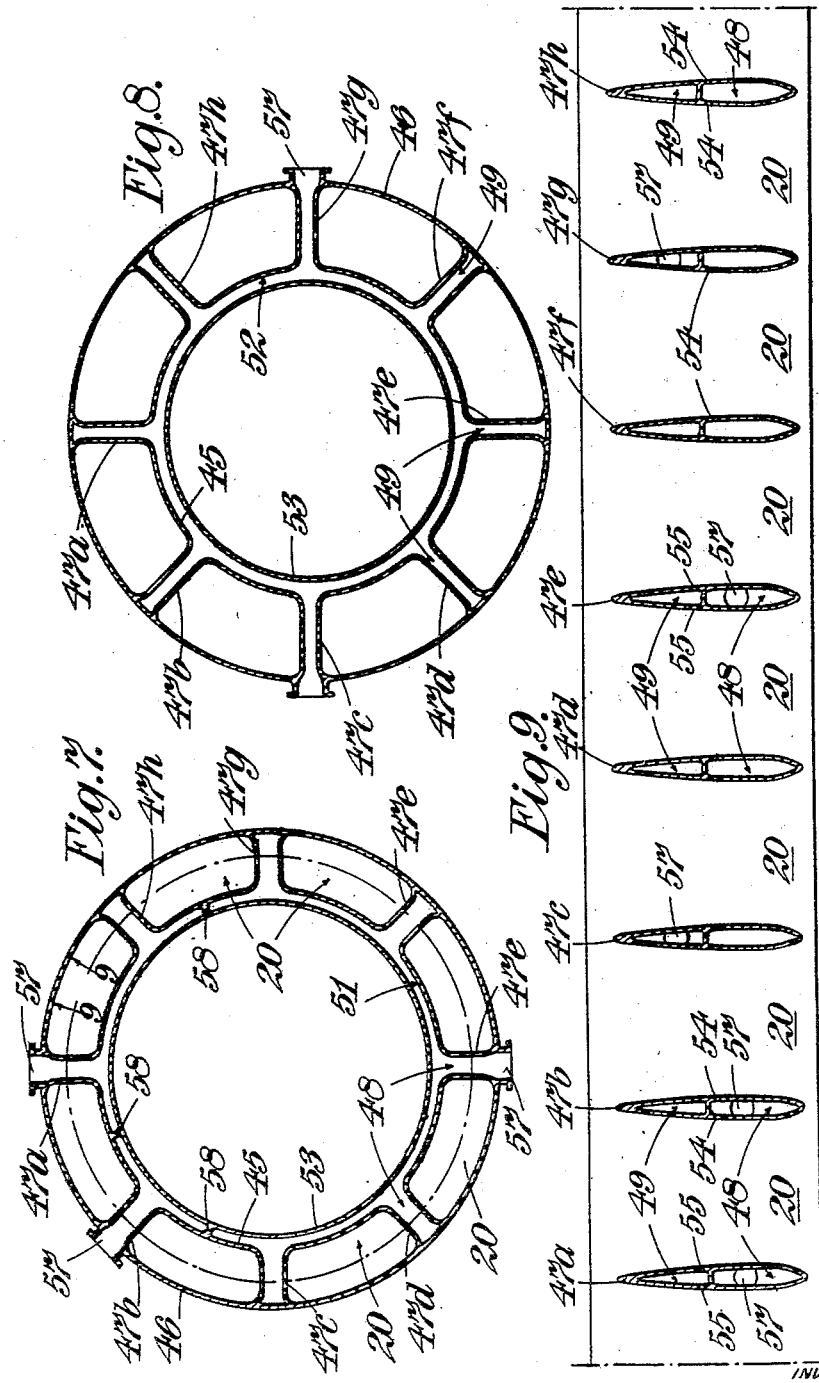

Patented June 29, 1954

2,682,363

UNITED STATES PATENT OFFICE 2,682,363

GAS TURBINE ENGINE

Adrian Albert Lombard, Allestree, and Edward Reginald Brealey, Derby, England, assignors to Rolls-Royce Limited, Derby, England, a British company Application December 3, 1951, Serial No. 259,526

Claims priority, application Great Britain December 8, 1950

12 Claims. (Cl. 230—47)

1

This invention relates to gas-turbine engines, and more particularly to gas-turbine engines having axial-flow compressors.

It is common practice to tap off air compressed in a compressor of the gas-turbine engine for auxiliary purposes, for instance for the prevention, retardation or removal of ice formation on parts of an aircraft in which the engine is installed, and it is an object of the present invention to provide means whereby air may be tapped-off from the engine working fluid duct and desirable air flow characteristics maintained within the engine.

According to this invention, a gas-turbine engine of the type having an axial-flow compressor, an inner duct-defining wall and an outer duct-defining wall at the outlet of said compressor, and a plurality of hollow strut-like members interconnecting said inner wall and said outer wall and dividing part at least of the working fluid duct between the walls into a plurality of axially-extending passages each bounded by a part of said inner wall, by a part of said outer wall, and by two adjacent strut-like members, is characterised in that a pair of adjacent strut-like members have apertures formed therein, which apertures are substantially symmetrically disposed with respect to the plane of symmetry of the passage between the pair of adjacent strut-like members, and which apertures are arranged to allow air to flow from the duct into the interiors of the pair of strut-like members, and outlet means communicating with the interiors of the strut-like members.

According to a preferred feature of this invention, a further wall is provided which is coaxial with the inner and outer duct-defining walls and co-operates with one of them to form annular collector manifold means. The annular collector manifold means may be arranged to provide a number of separate sources of tapped-off air by being divided by circumferentially-spaced walls into a number of sections or by circumferentially-extending walls. Likewise the hollow interiors of the struts may be divided by partitions into a number of chambers and it may be arranged that some of the strut-like members have air tapping apertures leading to the chamber upstream of the partition and others may have air-tapping apertures leading to the chambers downstream of the partition.

Two embodiments of the invention will now be described by way of example as applied to gas-turbine engines such as are used for the propulsion of aircraft which engines are of the type

2 comprising an axial-flow compressor, the description making reference to the accompanying drawings in which—

Figure 4:
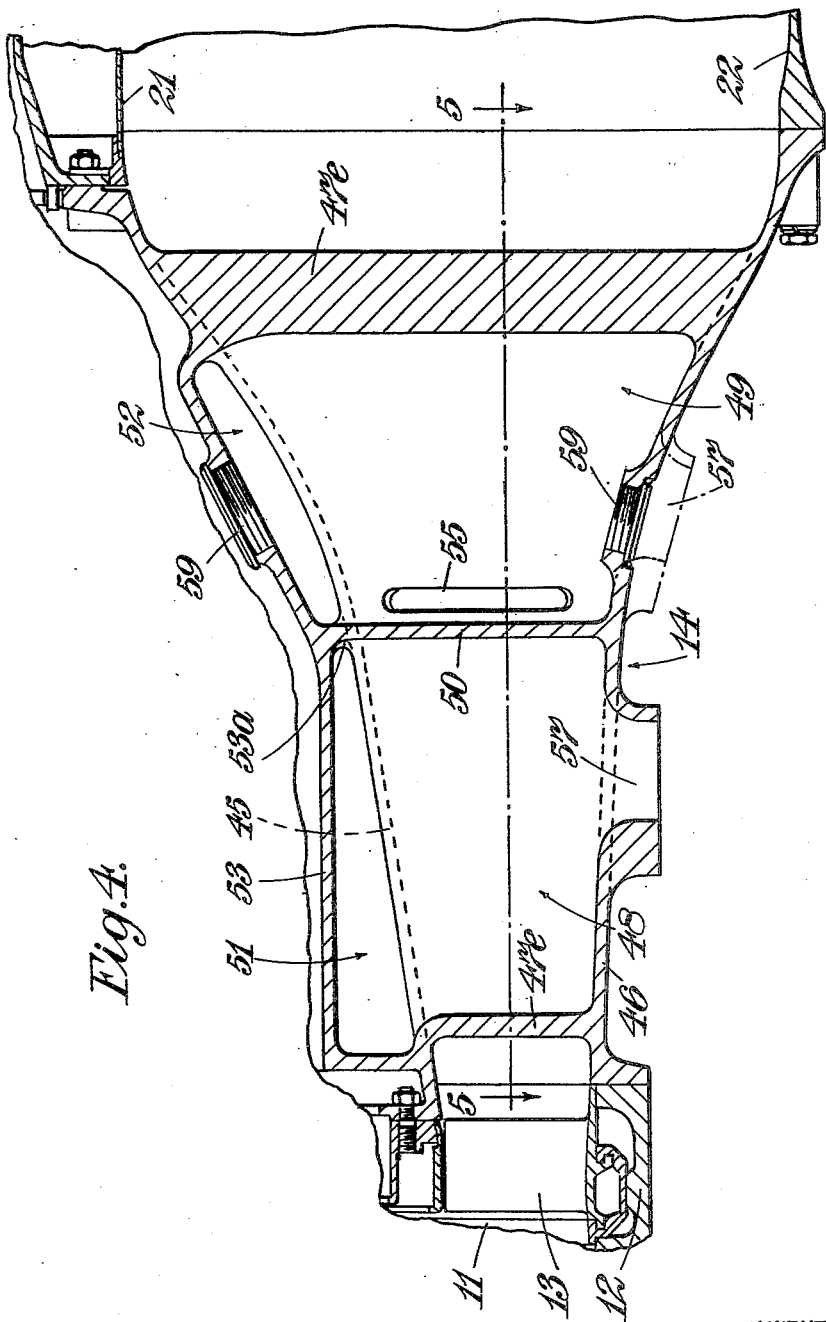
Figure 4 is a view corresponding to Figure 1 of the second embodiment.
Figure 5:
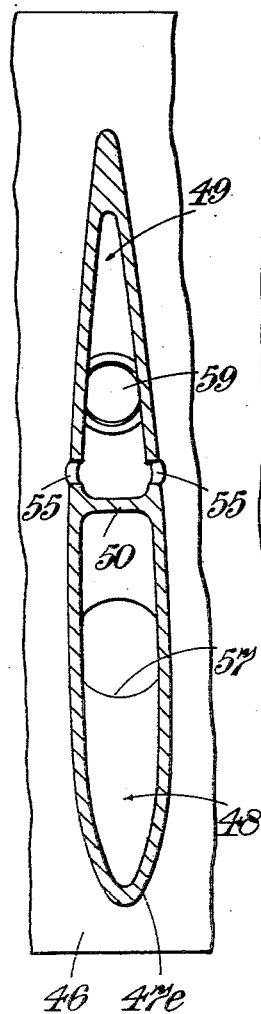
Figure 6:
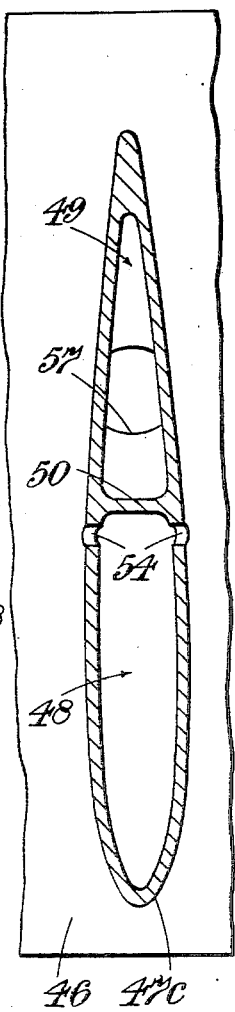

Figures 5 and 6 show details being sections on the line 5—5 of Figure 4 through similar parts of the embodiment, Figures 7 and 8 are diagrammatic sections through the embodiment of Figure 4 drawn to a smaller scale, the sections being taken on axially spaced planes at right angles to the axis of the embodiment, and Figure 9 is a developed section on the line 9—9 of Figure 7.

In a gas-turbine engine, the working fluid is compressed by the compressor and is delivered from the compressor to combustion equipment wherein fuel is burned with the air, and the products of combustion pass from the combustion equipment to a turbine which is connected to the compressor by a shaft to drive it. The exhaust gas from the turbine passes to atmosphere via a propelling nozzle as a propulsive jet, or energy in excess of that required to drive the compressor or compressors is extracted from the products of combustion by the same or another turbine and used, for example, to drive a propeller or a power output shaft.

Figure 1:
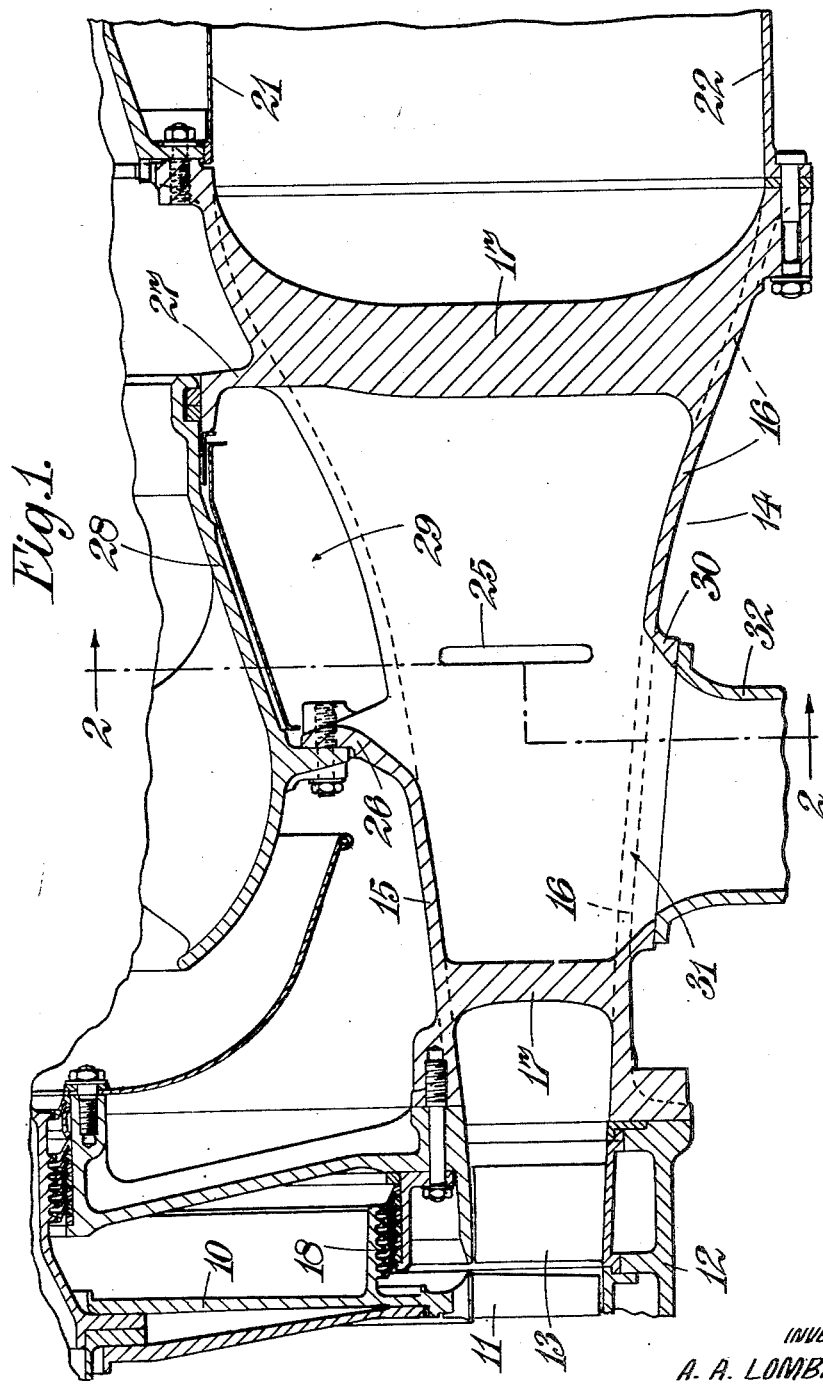
Figure 1 is an axial section through one embodiment.
Figure 2:
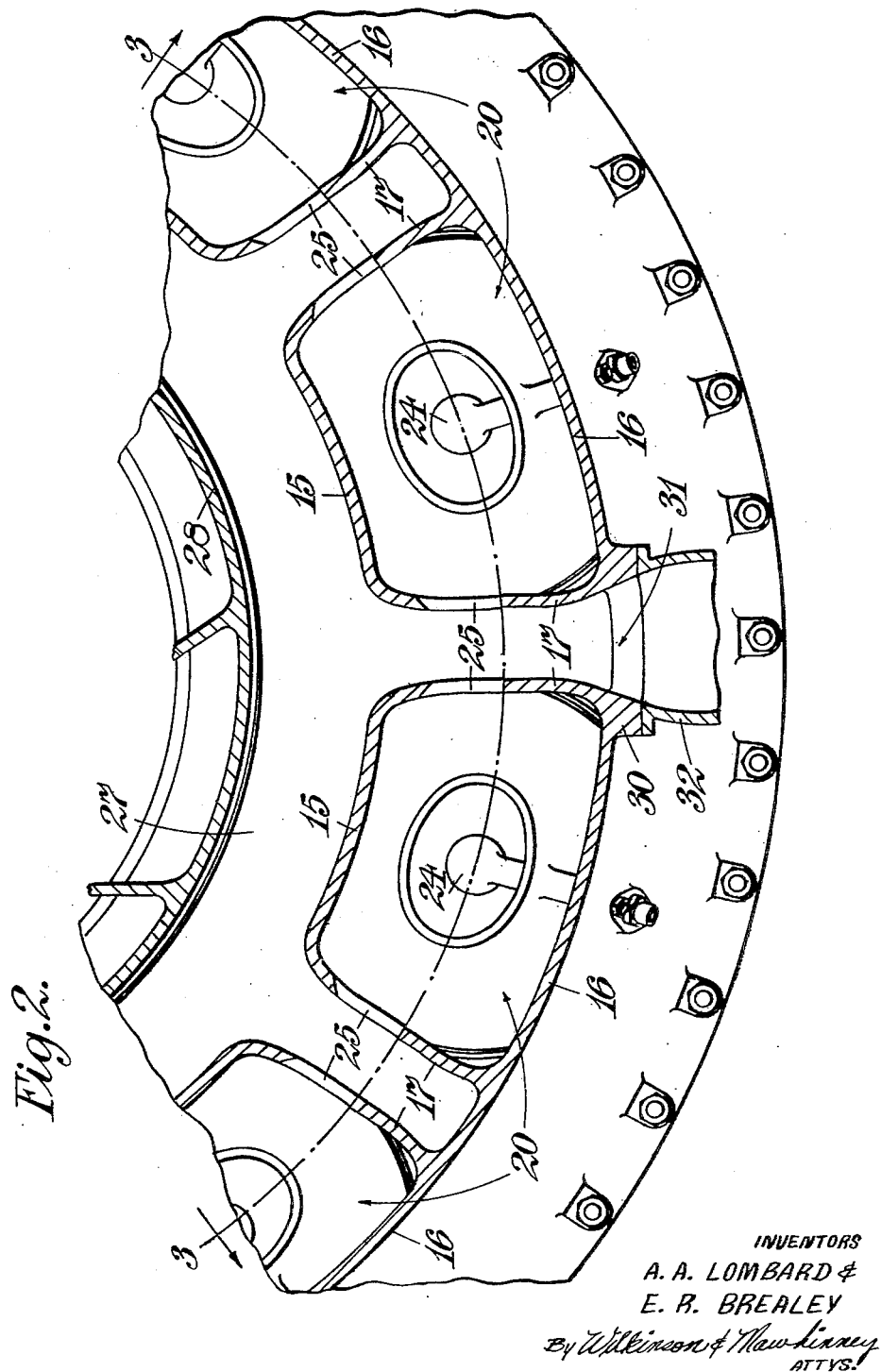
Figure 2 is a section on the line 2—2 of Figure 1.
Figure 3:
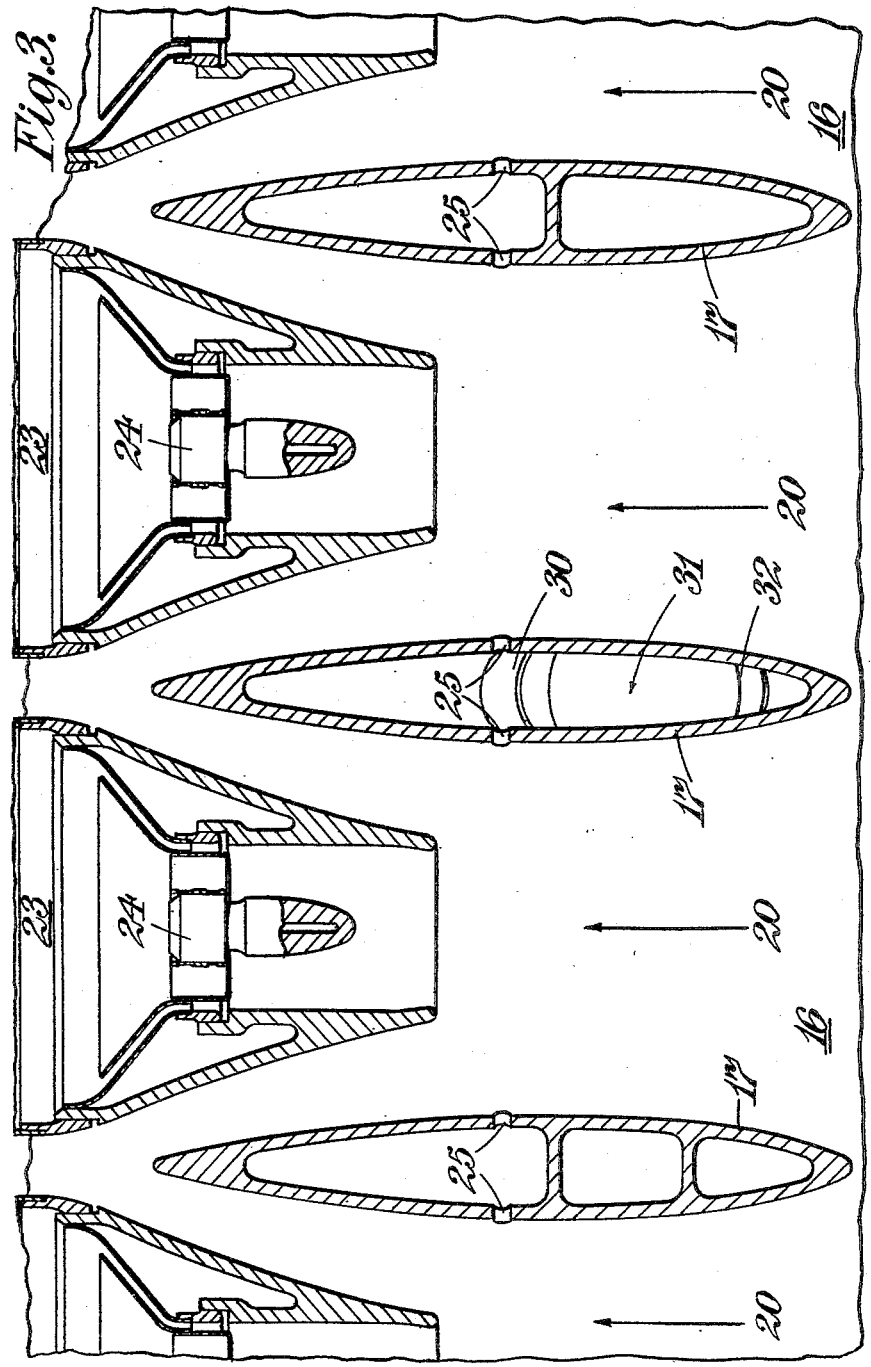
Figure 3 is a section on the line 3—3 of Figure 2.

Referring now to Figures 1 to 3, the compressor, only the outlet end of which is shown, is illustrated as comprising a rotor assembly and a stator assembly, the rotor assembly including a drum or a number of discs such as disc 10 and having rows of rotor blades 11 mounted at its periphery, and the stator assembly including a stator casing 12 surrounding the rotor blades and rows of stator blades 13 mounted to extend inwardly from the stator casing 12; the rotor blade rows 11 and stator blade rows 13 alternate along the length of the compressor. The stator casing 12 is usually split along a diametral plane. The rotor assembly 10, 11 and stator assembly 12, 13 together define an annular duct in which the working fluid is compressed by the action of the blades.

A diffuser chamber casing 14 is bolted to the stator casing 12. The diffuser chamber casing 14 comprises an inner annular wall 15 and an outer annular wall 16 joined together by a number of radial struts 17. The two annular walls 15, 16 define an annular duct which registers at its inlet end with the outlet end of the annular duct through the compressor. A labyrinth seal arrangement 18 is provided between the inlet end part of the inner annular wall 15 and the end compressor rotor disc 10 to minimise the escape of compressed air from the ducts where they join.

The radial struts 17 have their upstream edges located downstream of the inlet end of the diffuser chamber casing 14 and are integral with both the inner and outer walls 15, 16. The struts 17 divide the annular duct afforded between the walls 15, 16 into an equal number of circumferentially-spaced, axially-extending passages 20 (Figure 3), which passages 20 are of generally increasing cross-sectional area in the direction of flow of the air through them.

The combustion equipment of the gas-turbine engine may, as is well-known, comprise an annular combustion chamber formed by inner and outer air casing walls 21, 22 respectively which encircle the shaft (not shown) connecting the compressor rotor and a turbine of the engine and a plurality of flame tubes 23 (Figure 3) disposed within the annular space between the air casing walls 21, 22. Or, as is also well-known, the combustion equipment may comprise an annular combustion chamber formed by inner and outer air casing walls which encircle the shaft between a compressor and turbine, and an annular flame tube disposed within the annular space between the casing walls substantially coaxially with the air casing walls. Or, as is also well-known the combustion equipment may comprise a plurality of separate combustion chambers each having a tubular air casing and a substantially coaxial flame tube accommodated within the air casing in spaced relation thereto.

In a gas-turbine engine having either of the first two forms of combustion equipment described above, the inner and outer walls 15, 16 of the diffuser chamber casing 14 will, as shown, be arranged to be connected as by bolts to the inner and outer air casing walls 21, 22. In the arrangement shown, the plurality of flame tubes 23 have their inlet ends conveniently spaced circumferentially to be aligned centrally with the axially-extending passages 20 of the diffuser chamber casing 14, and a fuel injector 24 is provided for each flame tube 23. If a single annular flame tube is provided, the spacing of associated fuel injectors will preferably be correlated with the position of the passages 20; for example, one fuel injector may be supported between each pair of radial struts 17. In these forms of combustion equipment, the struts 17 may conveniently terminate just upstream of the downstream end of the diffuser chamber casing 14 so that the outlet from the diffuser chamber casing is a complete annulus.

In a gas-turbine engine having the third form of combustion equipment described above, the diffuser chamber casing will, as is well understood, be formed at its outlet end with a number of branches to correspond with the number of combustion chambers, the branches each forming a generally axial extension of an axial passage 20. Each radial strut, corresponding to a strut 17, will at its downstream end divide to provide one side wall of each of the two adjacent branches, the inner and outer walls of a branch being formed by continuations of the inner and outer annular walls of the diffuser chamber casing. A branch will conveniently change in cross-section from a sector of an annulus at its upstream end to a circle at its downstream end and the outlet will register with the inlet of the associated air casing.

The upstream ends of the flame tubes and the downstream ends of the struts may overlap in the axial direction, and the upstream ends of the combustion chambers may be supported as shown in Figure 3 by being engaged with an annular seating 35a at the outlet end of a duct part 35 the function of which is to divide the air flowing in the passages such as the passages 20 into two streams, one of which streams passes through the duct part 35 into the inlet end of the flame tube 23 and the other of which streams flows outside the duct part 35 and outside the flame tube 23 to enter it through holes in the wall of the flame tube in a well-known manner. The duct part 35 has formed in one piece with it a radially-extending part 36 which carries at its inner end the fuel nozzle 24 and at its outer end may provide a support for the duct part 35 by which it is attached to the wall 16.

It is sometimes required to tap-off compressed air from the working fluid passage of the engine, and the invention provides means for effecting such tapping of air.

In the arrangement of Figures 1 to 3, each radial strut 17 is made as a hollow shell having formed in its walls a pair of apertures 25, there being one aperture 25 in each of its circumferentially-directed walls at approximately the point of greatest thickness of the strut 17. Thus air which has been compressed in the compressor flows into a strut 17 from each of the axially-directed passages 20 separated by the strut, or in other words air flows from each passage 20 through a pair of apertures 25 one in each of the struts 17 which separate the passage 20 from the next adjacent passages 20.

An annular collector manifold is formed by providing a pair of axially-spaced flanges 26, 27 to upstand from the inner face of the inner annular wall 15 of the diffuser chamber casing 14, and a co-operating annular part 28 which is bolted to the flange 26 and is in sealing engagement with an axially-directed portion of the other flange 27. The interior of each strut 17 is in communication at its radially inner end with the manifold 29 and the compressed air flowing from the passages 20 through the apertures 25 into the hollow struts 17 flows from the struts 17 into the manifold duct 29. One of the struts 17 (that seen in Figure 1) opens at its radially outer end to an outlet port 31 which is bounded peripherally by a facing 30 formed on the outer surface on the outer annular wall 16.

An outlet conduit 32 is secured to the facing to register with the outlet port 31 and compressed air thus flows from the manifold 29 through the outlet conduit 32 to be conveyed to the point where it is desired to use the air. Two or more outlet conduits 32 may be provided if desired.

The interior of a hollow strut 17 may be divided into two or more chambers, for instance as are the right-hand and left-hand struts 17 (Figure 3), and those chambers through which air is not tapped off may be used as breather passages for the interior of the engine, or for example to permit auxiliary drive shafts to extend therethrough.

It is important that the velocity distribution of the air at the entry to the combustion equipment should be as uniform as possible and should remain so, irrespective of changes in operating conditions. It will be seen that this desideratum is met by the construction of the invention, in that the quantity of air tapped off for auxiliary purposes may be varied over a wide range without upsetting the distribution of the air flowing into the combustion equipment.

As indicated above, the air tapped-off may be conveyed away through two or more outlets connected with the struts 17.

Referring now to Figures 4 to 9, there are illustrated other ways in which more than one tapping may be effected. Other features are also shown.

In this arrangement, the diffuser chamber casing 14 comprises as before inner and outer walls 45, 46 respectively, which define an annular compressed air duct which is divided up into a number of passages 20 by a corresponding number (say eight) of hollow struts 47a, 47b, 47c, 47d, 47e, 47f, 47g, 47h.

Each strut has its interior divided by a partition 50 into two chambers 48, 49 (see Figures 4, 5, 6 and 9) and the chambers 48, 49 communicate respectively with annular collector manifolds 51, 52 which are formed between inner working-fluid duct wall 45 and a further wall 53, which is in one piece with the diffuser chamber casing, and which manifolds are separated by a radial web 53a extending circumferentially around the diffuser chamber casing between the walls 45, 52 at the axial location of the partition 50.

The struts have slots formed in their circumferentially facing walls to permit compressed air to flow into one of the chambers 48, 49. Thus some struts, say the struts 47b, 47c, 47d, 47f, 47g, 47h, are formed, as shown in Figure 6, with slots 54 which are located just upstream of their partitions 50 and so feed air via chamber 48 into manifold 51, and other struts, say the struts 47a and 47e, have slots 55 formed in them (see Figure 5) just downstream of their partitions 50 and so feed air via chambers 49 into the manifold 52.

In the arrangement shown, the air is drawn off from the manifolds 51, 52 either through outlets from the outer ends of a chamber 48 or 49 which has no slots 54 or 55 opening into it, or from outlets in a slotted chamber. Thus an outlet 57 is provided from chamber 48 of strut 47e through which air is drawn from manifold 51, and in the case of strut 47c (Figures 8, 9) air is drawn off via chamber 49 from manifold 52.

If necessary an annular manifold may be divided into a number of part-annular take-off sections permitting two separate supplies from one diffuser chamber casing. Thus, as will be seen in Figures 7 and 9, the upstream manifold 51 is divided into a number of sections by axial partitions 58, one section communicating with the chamber 48 of strut 47b which is also formed with its outlet 57 at the outer end of the chamber 48, a second section communicating with chambers 48 of struts 47a, 47h, of which chamber 48 of strut 47h forms the air inlet and strut 47a is provided with the air outlet 57, and a third section which is fed with air from the chambers 48 of the struts 47c, 47d, 47f and 47g and has its outlet through chamber 48 of strut 47e which leads to an outlet 57.

The annular manifold including walls 45, 46 may be formed by casting, and in this case the chambers 48, 49 may be formed by means of cores. The cores must be supported through apertures in the boundary walls of the chamber, and these are closed by means of core plugs 59 (Figures 4 and 5). The apertures may be employed to permit an auxiliary shaft to extend through the diffuser chamber casing into the interior of the engine.

The invention is not limited to the particular embodiments described with reference to the drawings; for example, a strut may have a single air tapping aperture in its leading edge, provided that the apertures are symmetrically disposed with respect to the axially-directed passages 20. In this case it may be found desirable also to provide an aperture at the trailing edge through which pressure air is allowed to lead, to maintain the desired air flow characteristics.

In another arrangement of the invention, each of the struts has formed in it two apertures, one in each of its circumferentially-directed faces, whereby the interior of the strut is placed in communication with the axially-extending passages on each side of the member.

In yet another arrangement of the invention as applied to a gas-turbine engine having an even number of struts, each strut is formed with a single aperture in one of its circumferentially-directed walls, the apertures being so arranged that they are in oppositely-directed walls in adjacent struts. In such an arrangement, therefore, alternate passages will have a pair of apertures one opening into each of the pair of struts which separate the passage from the next adjacent passages. These next adjacent passages will have no apertures in their boundry walls.

The apertures which open into the struts may be of different sizes provided that the two apertures which are formed one in each of the boundary walls of the passage into which they open are substantially of the same size.

We claim:

1. A gas-turbine engine comprising an axial flow compressor, an inner-duct-defining wall and an outer duct-defining wall at the outlet of said compressor, and a plurality of hollow strut-like members interconnecting said inner wall and said outer wall and dividing part at least of the working-fluid duct between the walls into a plurality of axially-extending passages each bounded by a part of said inner wall, by a part of said outer wall, and by two adjacent strut-like members, characterised in that a pair of adjacent strut-like members have apertures formed therein, which apertures are substantially symmetrically disposed with respect to the plane of symmetry of the passage between the pair of adjacent strut-like members, and which apertures are arranged to allow air to flow from the duct into the interiors of the pair of strut-like members, there being provided also outlet means communicating with the interiors of the strut-like members.

2. A gas-turbine engine as claimed in claim 1, having an even number of strut-like members each formed with a single aperture in one of its circumferentially-directed walls, the apertures being so arranged that they are in oppositely-directed walls in adjacent strut-like members.

3. A gas-turbine engine as claimed in claim 1, having only two of its plurality of strut-like members apertured, each of said two strut-like members being formed with one aperture in one of its circumferentially-directed walls, the two strut-like members being adjacent members and the apertured walls being the boundary walls of the duct passage between the two strut-like members.

4. A gas-turbine engine comprising an axial-flow compressor, an inner-duct-defining wall and an outer duct-defining wall at the outlet of said compressor, and a plurality of hollow strut-like members interconnecting said inner wall and said outer wall and dividing part at least of the working-fluid duct between the walls into a plurality of axially-extending passages each bounded by a part of said inner wall, by a part of said outer wall, and by two adjacent strut-like members, characterised in that a pair of adjacent strut-like members have apertures formed therein, which apertures are substantially symmetrically disposed with respect to the plane of symmetry of the passage between the pair of adjacent strut-like members, and which apertures are arranged to allow air to flow from the duct into the interiors of the pair of strut-like members, and in that there is also provided a further wall coaxial with said inner and outer walls and outside said duct, which further wall co-operates with one of said duct-defining walls to form annular collector manifold means communicating with the interiors of the strut-like members to receive tapped-off air therefrom, and outlet means communicating with the interiors of the strut-like members.

5. A gas-turbine engine as claimed in claim 4, wherein said further wall is bolted to a flange extending radially inwards from the inner duct-defining wall and co-operates in a gas-sealing manner with a second and axially-spaced flange extending inwardly from said inner duct-defining wall.

6. A gas-turbine engine as claimed in claim 4, wherein said inner and outer duct-defining walls, said strut-like members and said further wall are formed in one piece with one another.

7. A gas-turbine engine as claimed in claim 4, wherein the outlet means communicates with the manifold means through the hollow interior of a strut-like member.

8. A gas-turbine engine comprising an axial-flow compressor, an inner-duct-defining wall and an outer duct-defining wall at the outlet of said compressor, and a plurality of hollow strut-like members interconnecting said inner wall and said outer wall and dividing part at least of the working-fluid duct between the walls into a plurality of axially-extending passages each bounded by a part of said inner wall, by a part of said outer wall, and by two adjacent strut-like members, characterised in that a plurality of pairs of adjacent strut-like members have apertures formed therein, the apertures which open into a passage between a pair of adjacent strut-like members being substantially symmetrically disposed with respect to the plane of symmetry of said passage and which apertures are arranged to allow air to flow from the duct into the interiors of the pairs of strut-like members, in that the hollow strut-like members are divided internally by partitions into upstream and downstream chambers, some of said strut-like members having their air tapping apertures upstream of the partition and others having their air tapping apertures downstream of their partitions and in that there is also provided a further wall coaxial with said inner and outer walls and outside said duct, which further wall co-operates with one of said duct-defining walls to form annular collector manifold means communicating with the interiors of the strut-like members to receive tapped-off air therefrom and to afford at least two separate sources of tapped-off air, and outlet means communicating with the annular collector manifold means.

9. A gas-turbine engine as claimed in claim 8, wherein said annular collector manifold means is divided to afford at least two collector manifolds by a circumferentially-extending web which extends radially from said further wall to the co-operating duct-defining wall at the axial location of the partitions which divide the interiors of the hollow strut-like members into separate chambers.

10. A gas-turbine engine as claimed in claim 8, having said outlet means arranged to communicate with one of said chambers in the divided interior of a strut-like member at the end of the chamber remote from the associated annular collector manifold means.

11. A gas-turbine engine as claimed in claim 8, wherein the outlet means communicate with one of the said chambers in the divided interior of a strut-like member on the side of the dividing partition remote from the air-tapping apertures in said strut-like member, and at the end of the chamber remote from the associated annular collector manifold means.

12. A gas-turbine engine comprising an axial-flow compressor, an inner annular duct-defining wall and an outer annular duct-defining wall at the outlet of said compressor, and a plurality of substantially radial, hollow strut-like members interconnecting said inner annular wall and said outer annular wall and dividing part at least of the working fluid duct between the walls into a plurality of axially-extending passages each bounded by a part of said inner wall, by a part of said outer wall, and by two adjacent strut-like members, characterised in that each of said strut-like members has a pair of apertures formed therein, which apertures are substantially symmetrically disposed with respect to the planes of symmetry of each passage between adjacent pairs of strut-like members, and which apertures are arranged to allow air to flow from the duct into the interiors of said strut-like members, and outlet means communicating with the interior of the strut-like members.

References Cited in the file of this patent

UNITED STATES PATENTS

| Number | Name | Date |
|--------|------|------|
| 2,314,058 | Stalker | Mar. 16, 1943 |
| 2,344,835 | Stalker | Mar. 21, 1944 |
| 2,469,375 | Flagle | May 10, 1949 |

FOREIGN PATENTS

| Number | Country | Date |
|--------|---------|------|
| 619,390 | Great Britain | Mar. 8, 1949 |
| 959,401 | France | Sept. 26, 1949 |